(12) United States Patent
Komori et al.

(10) Patent No.: US 7,832,942 B2
(45) Date of Patent: Nov. 16, 2010

(54) WHEEL BEARING APPARATUS

(75) Inventors: Kazuo Komori, Iwata (JP); Tomoko Baba, Iwata (JP); Masahiro Kiuchi, Iwata (JP)

(73) Assignee: NTN Corporation (JP)

( * ) Notice: Subject to any disclaimer, the term of this patent is extended or adjusted under 35 U.S.C. 154(b) by 78 days.

(21) Appl. No.: 12/394,117

(22) Filed: Feb. 27, 2009

(65) Prior Publication Data

US 2009/0154864 A1 Jun. 18, 2009

Related U.S. Application Data

(63) Continuation of application No. PCT/JP2007/000944, filed on Aug. 31, 2007.

(30) Foreign Application Priority Data

| Sep. 1, 2006 | (JP) | 2006-237136 |
| Nov. 14, 2006 | (JP) | 2006-307601 |
| Dec. 26, 2006 | (JP) | 2006-348842 |

(51) Int. Cl.
*F16C 19/38* (2006.01)
(52) U.S. Cl. ............ 384/544; 384/589
(58) Field of Classification Search ........... 384/544, 384/589, 504
See application file for complete search history.

(56) References Cited

U.S. PATENT DOCUMENTS

| 5,226,737 | A * | 7/1993 | Sandy, Jr. ............ 384/544 |
| 7,104,695 | B2 * | 9/2006 | Shevket ............... 384/450 |
| 7,614,796 | B2 * | 11/2009 | Hattori et al. .......... 384/544 |
| 7,641,394 | B2 * | 1/2010 | Komori et al. .......... 384/544 |

| 2007/0031079 | A1 | 2/2007 | Komori et al. |

FOREIGN PATENT DOCUMENTS

| DE | 199 45 255 | 4/2001 |
| EP | 1 131 214 | 9/2001 |
| EP | 1 623 846 | 2/2006 |
| JP | 2003-509280 | 3/2003 |
| JP | 2003-232343 | 8/2003 |

(Continued)

*Primary Examiner*—Thomas R Hannon
(74) *Attorney, Agent, or Firm*—Harness, Dickey & Pierce, P.L.C.

(57) ABSTRACT

A vehicle wheel bearing apparatus has an outer member and an inner member. The inner member has a wheel hub and at least one inner ring fit onto a cylindrical portion of the wheel hub or an outer raceway surface of a constant velocity universal joint. Double row rolling element groups are freely rollably contained between said inner and outer raceway surfaces of the inner member and the outer member. A pitch circle diameter of the ball element group near to the wheel mounting flange is larger than that of the double row ball group away from the wheel mounting flange. A maximum diameter of the outer raceway surface of the smaller diameter side of the double row outer raceway surfaces of the outer member is substantially the same as an inner diameter of a shoulder portion of the outer diameter side. The size of each rolling element of the group near to the wheel mounting flange is different from that of each rolling element of the group away from the wheel mounting flange. The number of rolling elements of the group near to the wheel mounting flange is larger than the number of rolling elements of the group away from the wheel mounting flange.

11 Claims, 11 Drawing Sheets

FOREIGN PATENT DOCUMENTS

| | | |
|---|---|---|
| JP | 2004-108449 | 4/2004 |
| JP | 2004-340242 | 12/2004 |
| JP | 2005-106238 | 4/2005 |
| JP | 2005-147298 | 6/2005 |
| JP | 2006-200628 | 8/2006 |
| WO | WO 01/21418 | 3/2001 |
| WO | WO 2004/101295 | 11/2004 |

* cited by examiner

[ Fig 1 ]
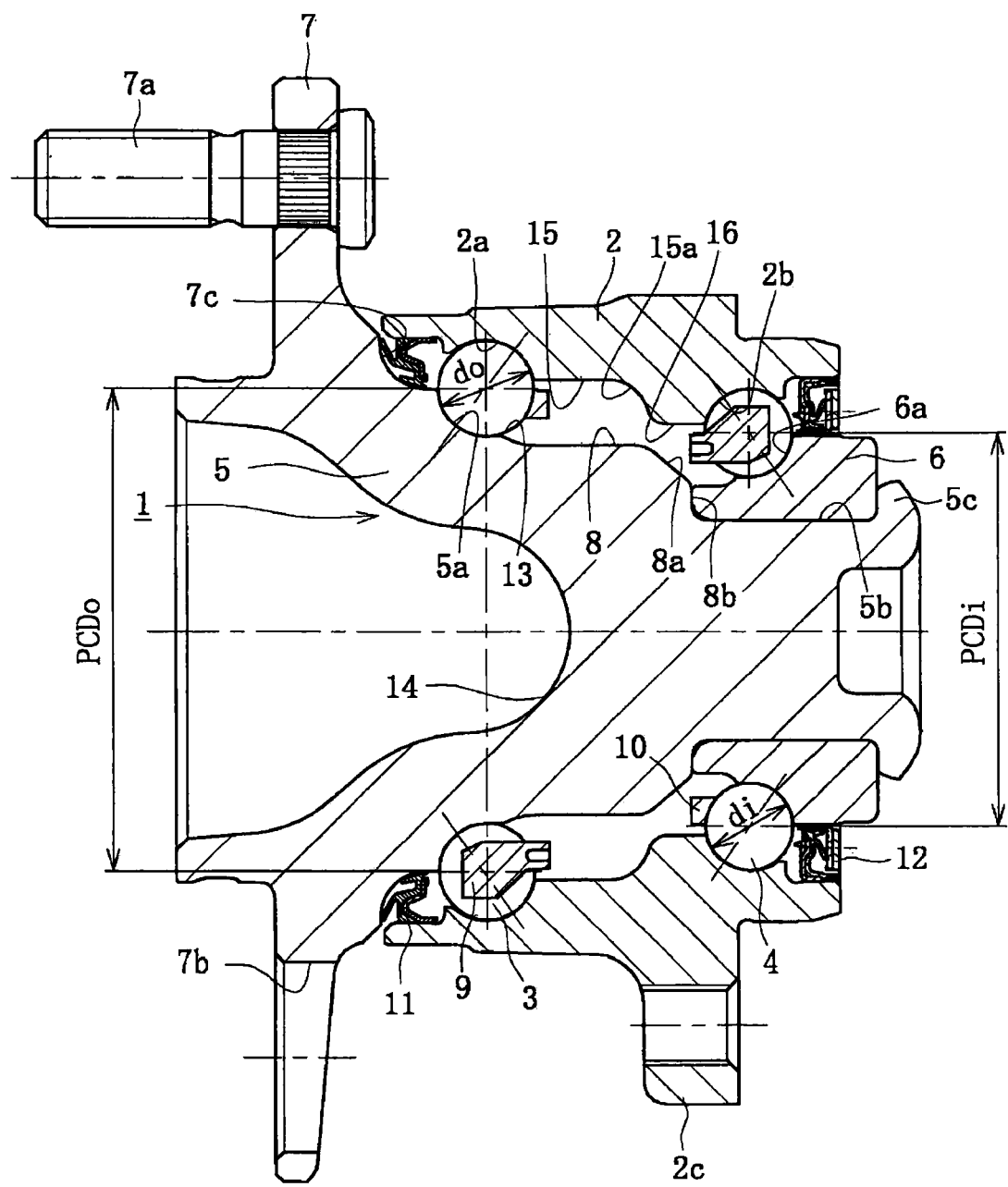

[Fig 2]
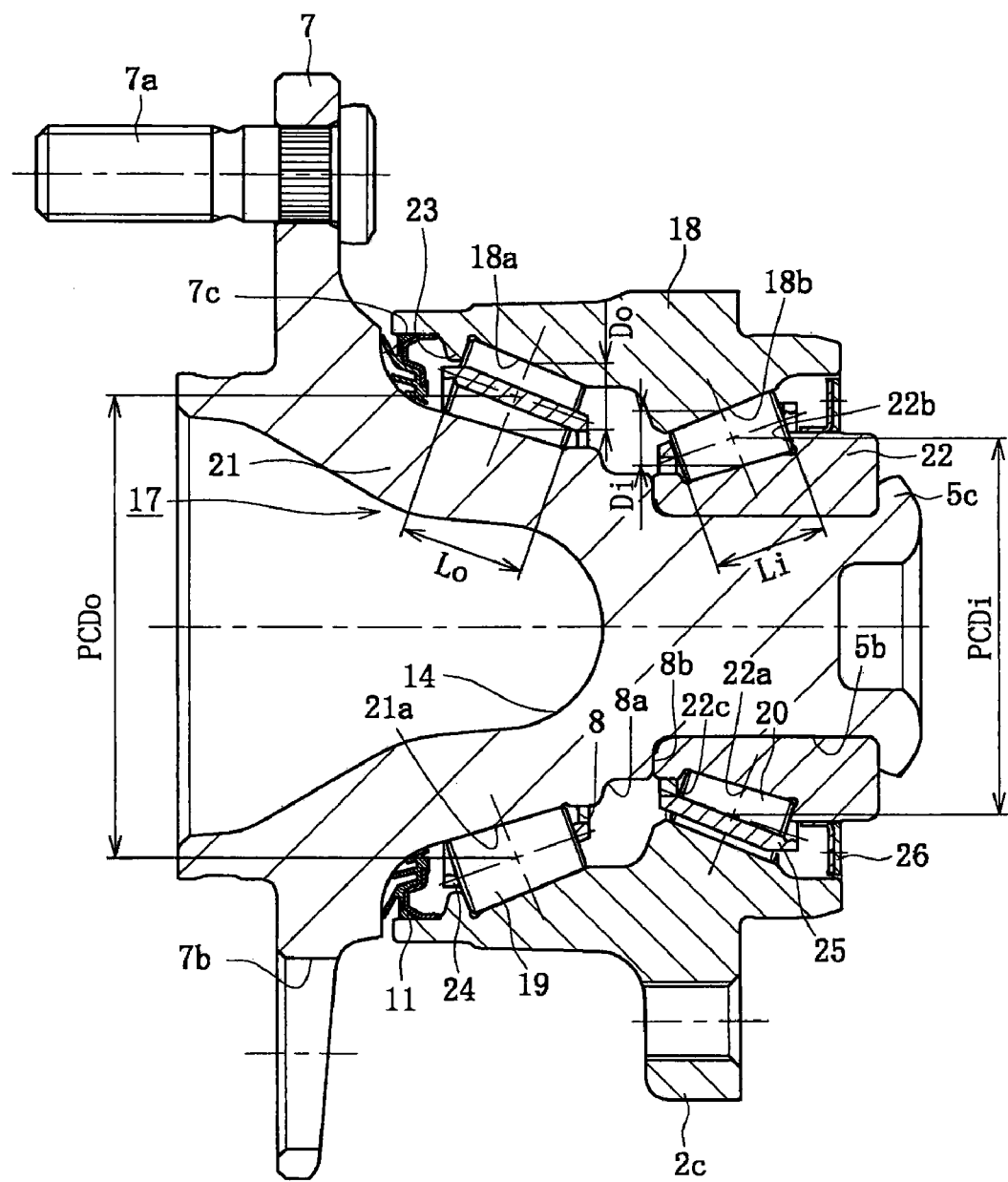

[Fig 3]
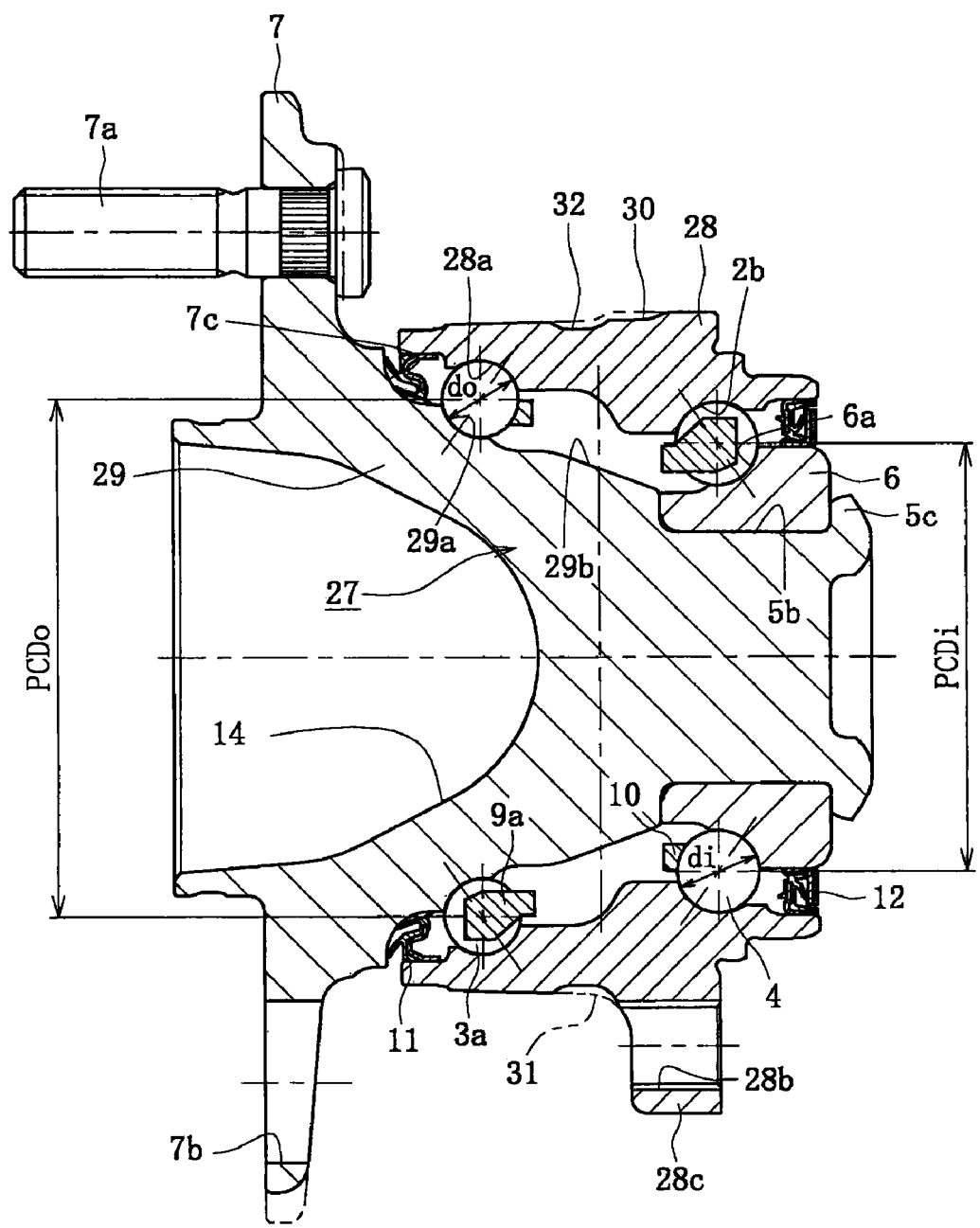

[ Fig 4 ]
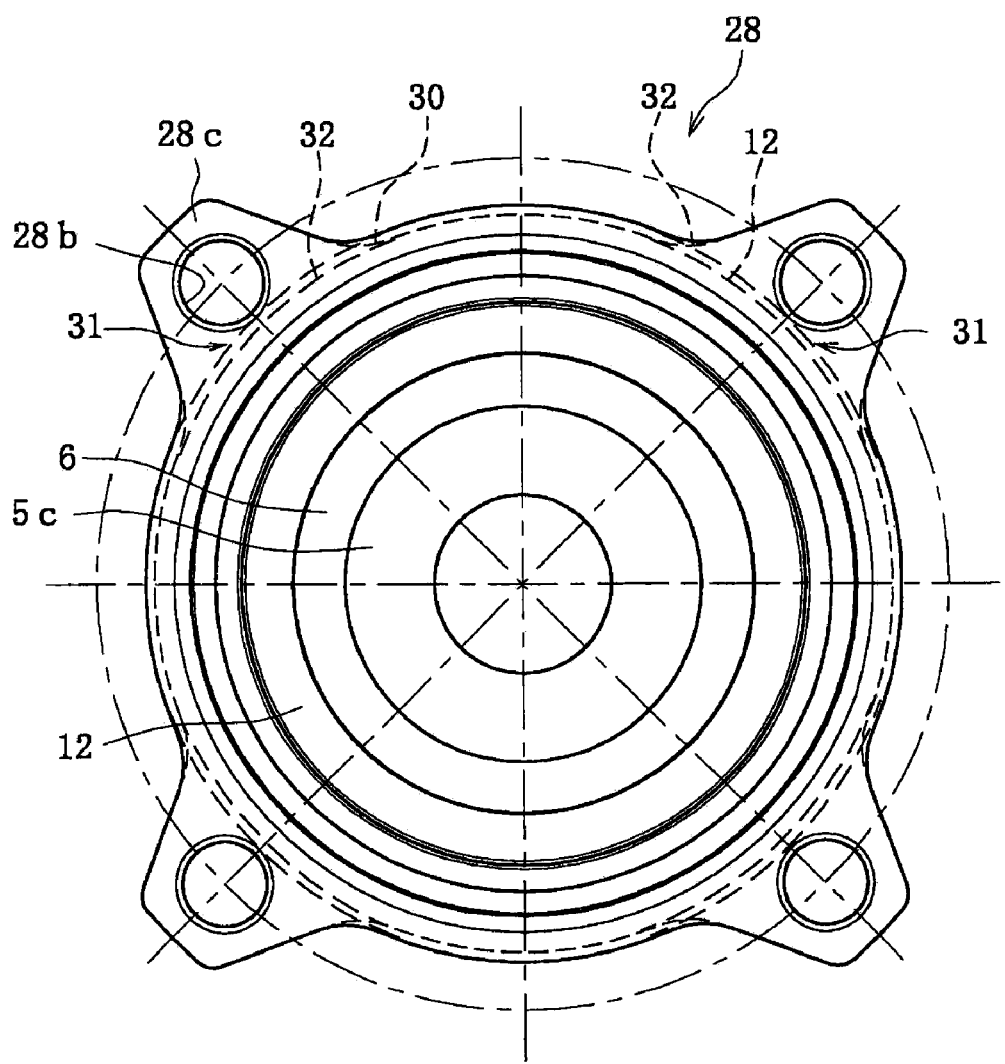

[ Fig 5 ]
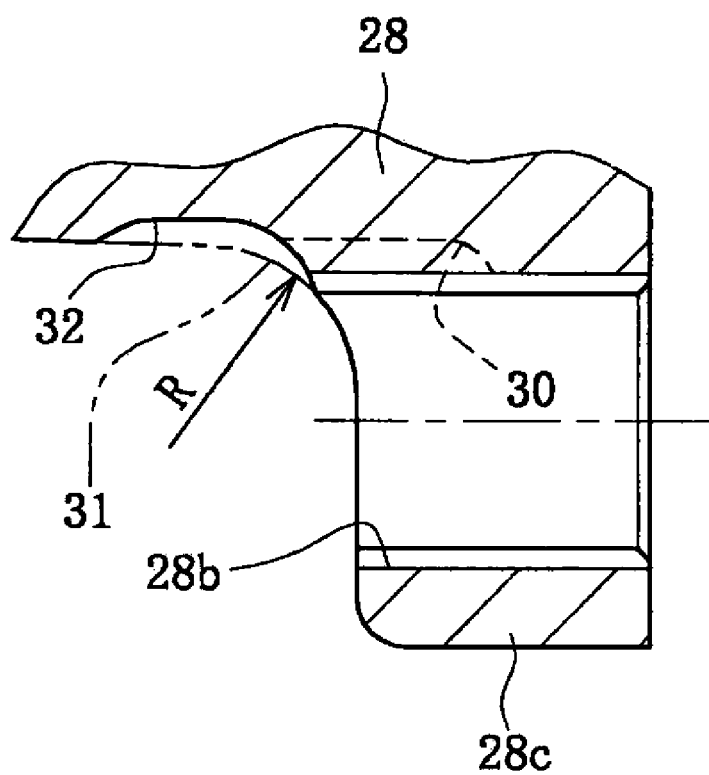

[Fig 6]
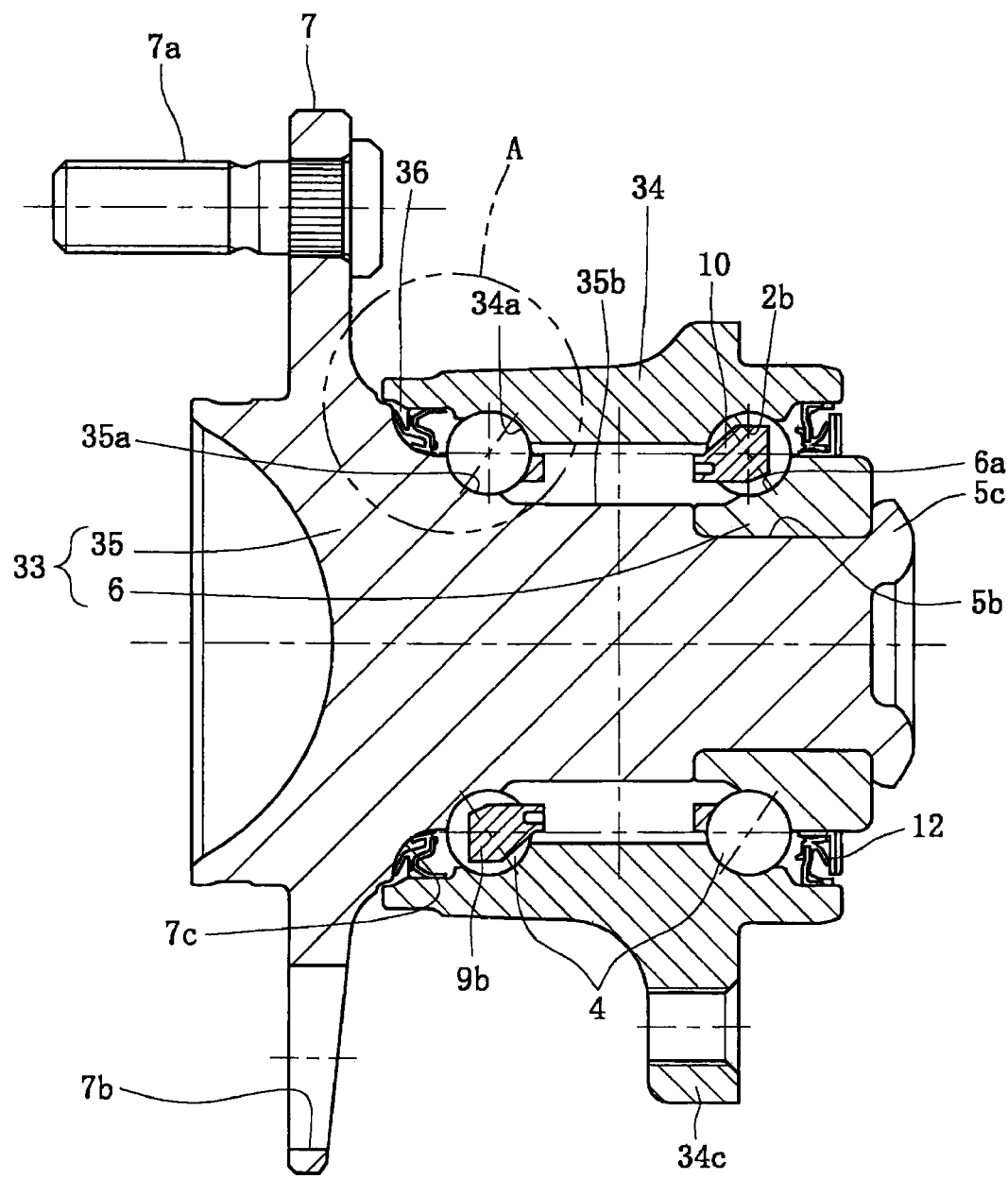

[Fig 7]
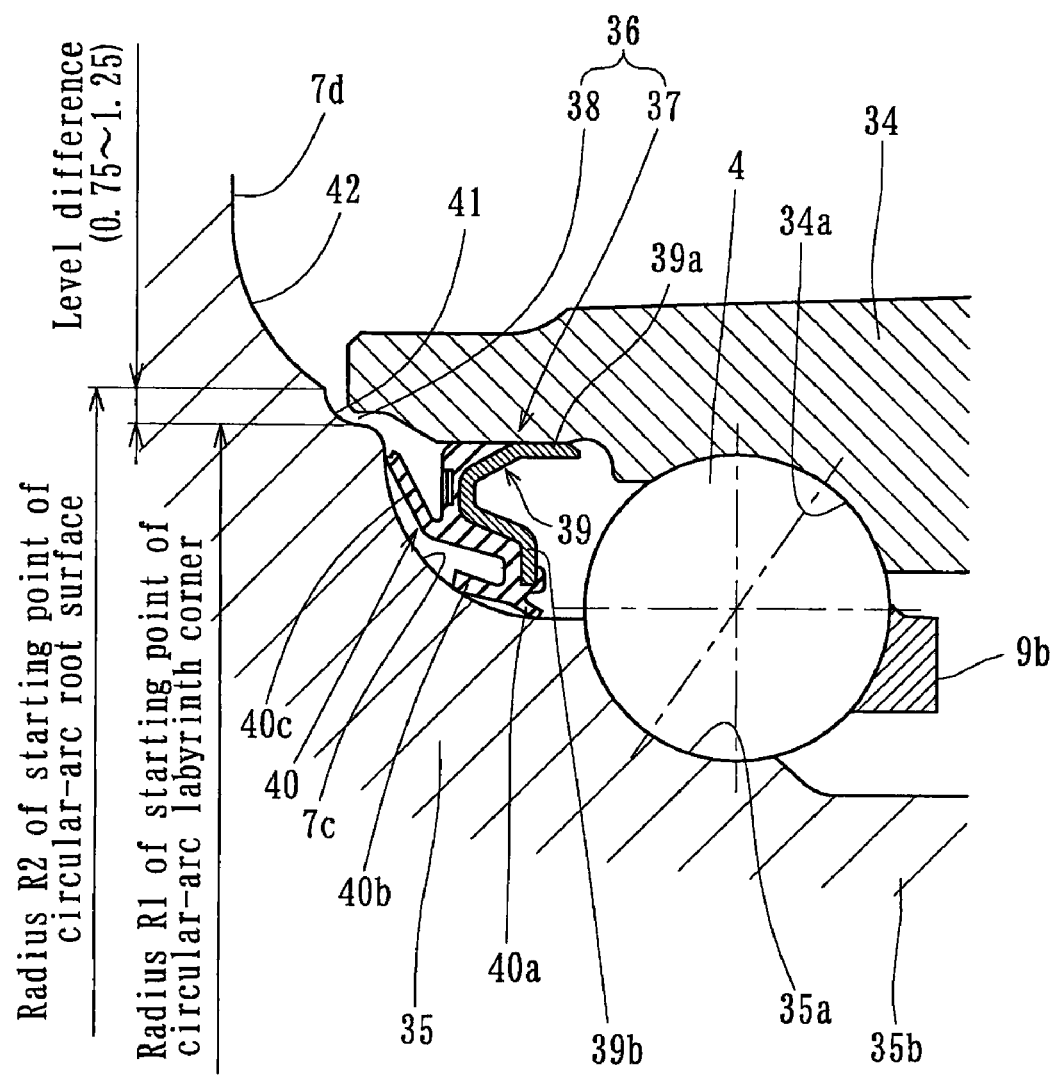

[Fig 8]
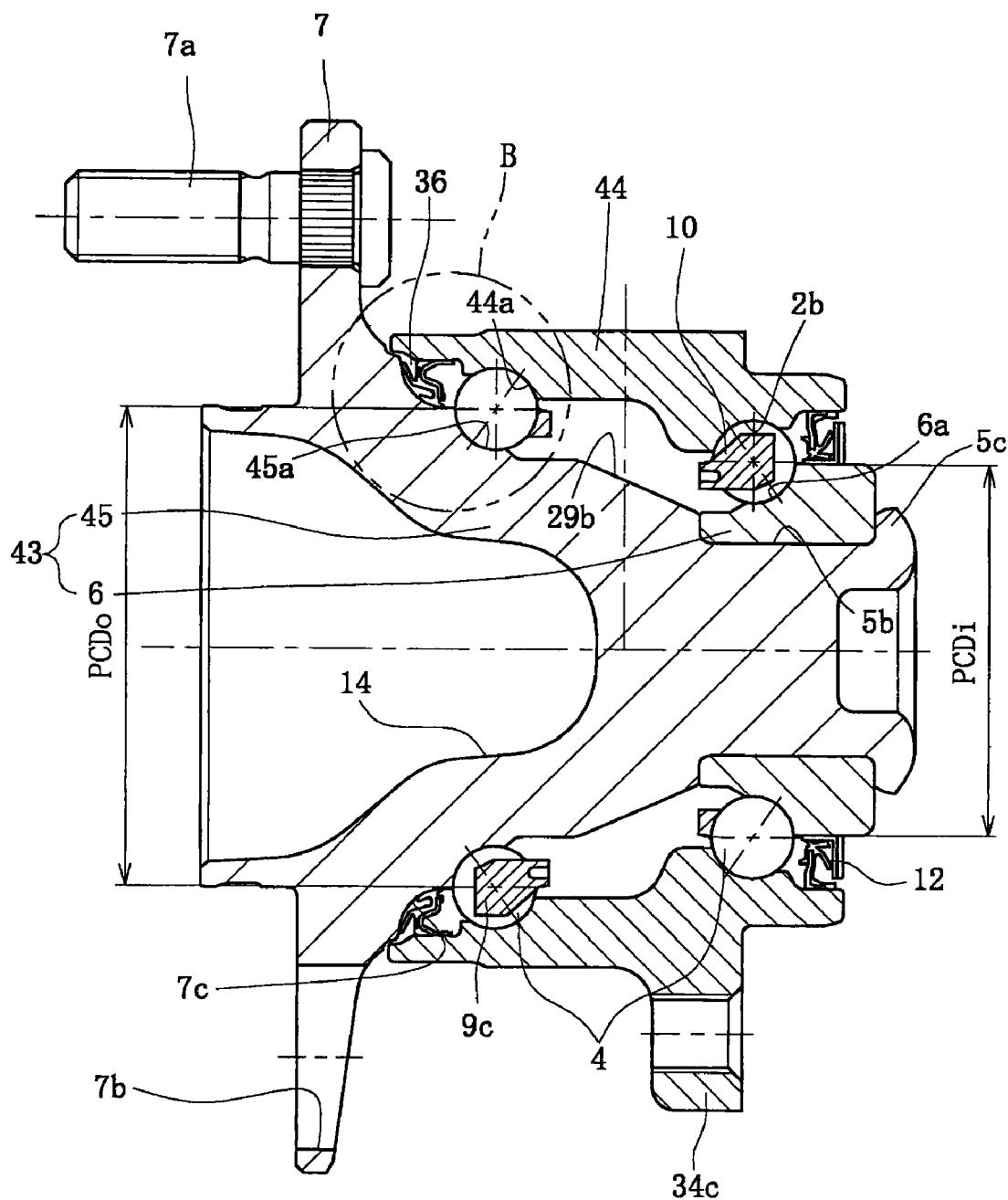

[ Fig 9 ]
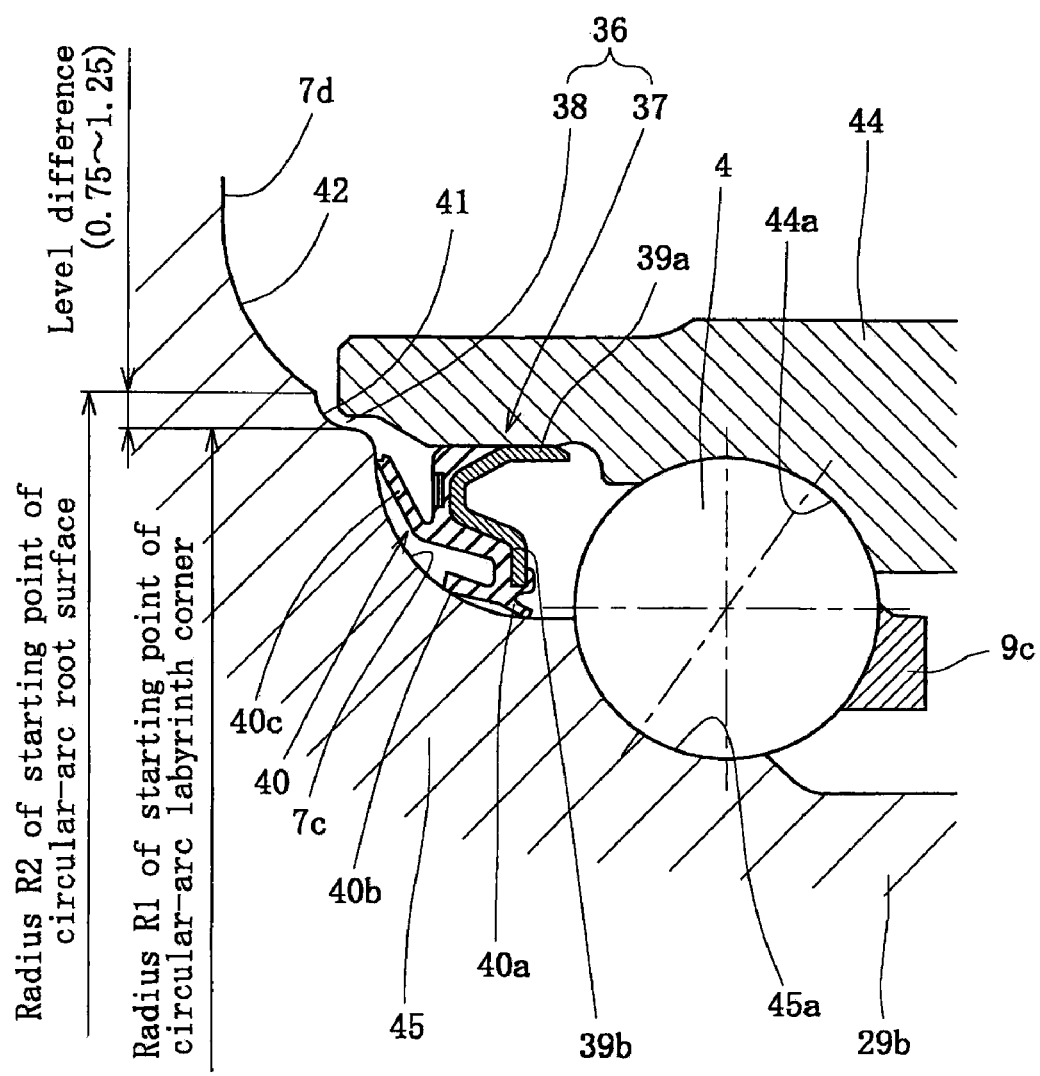

[ Fig 10 ]
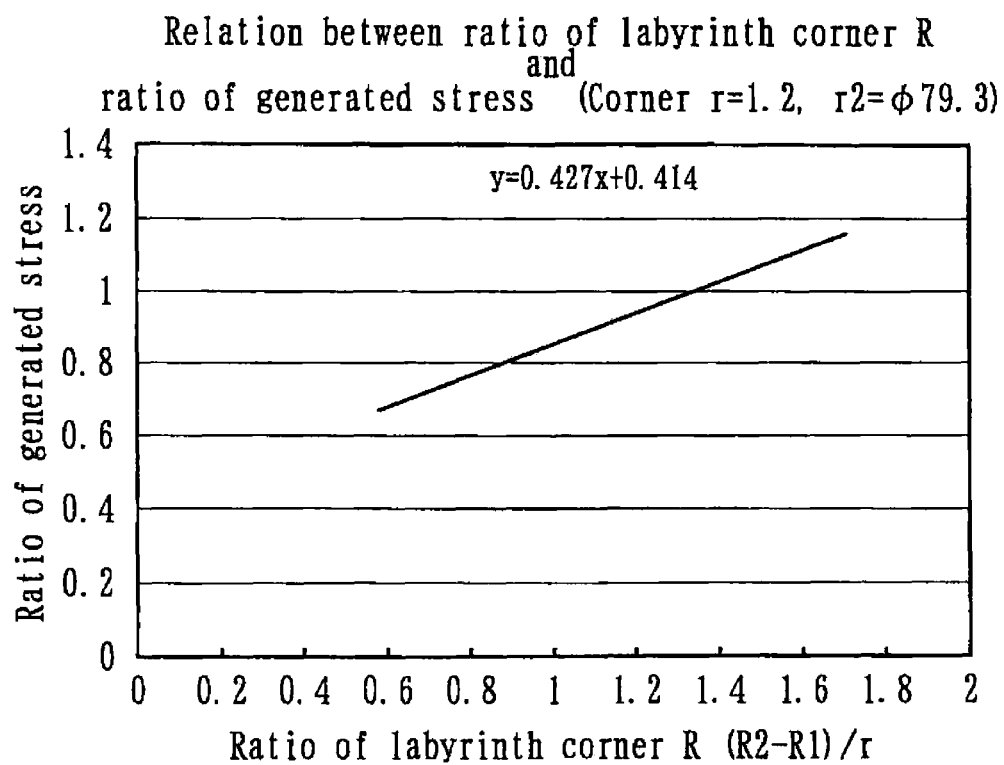

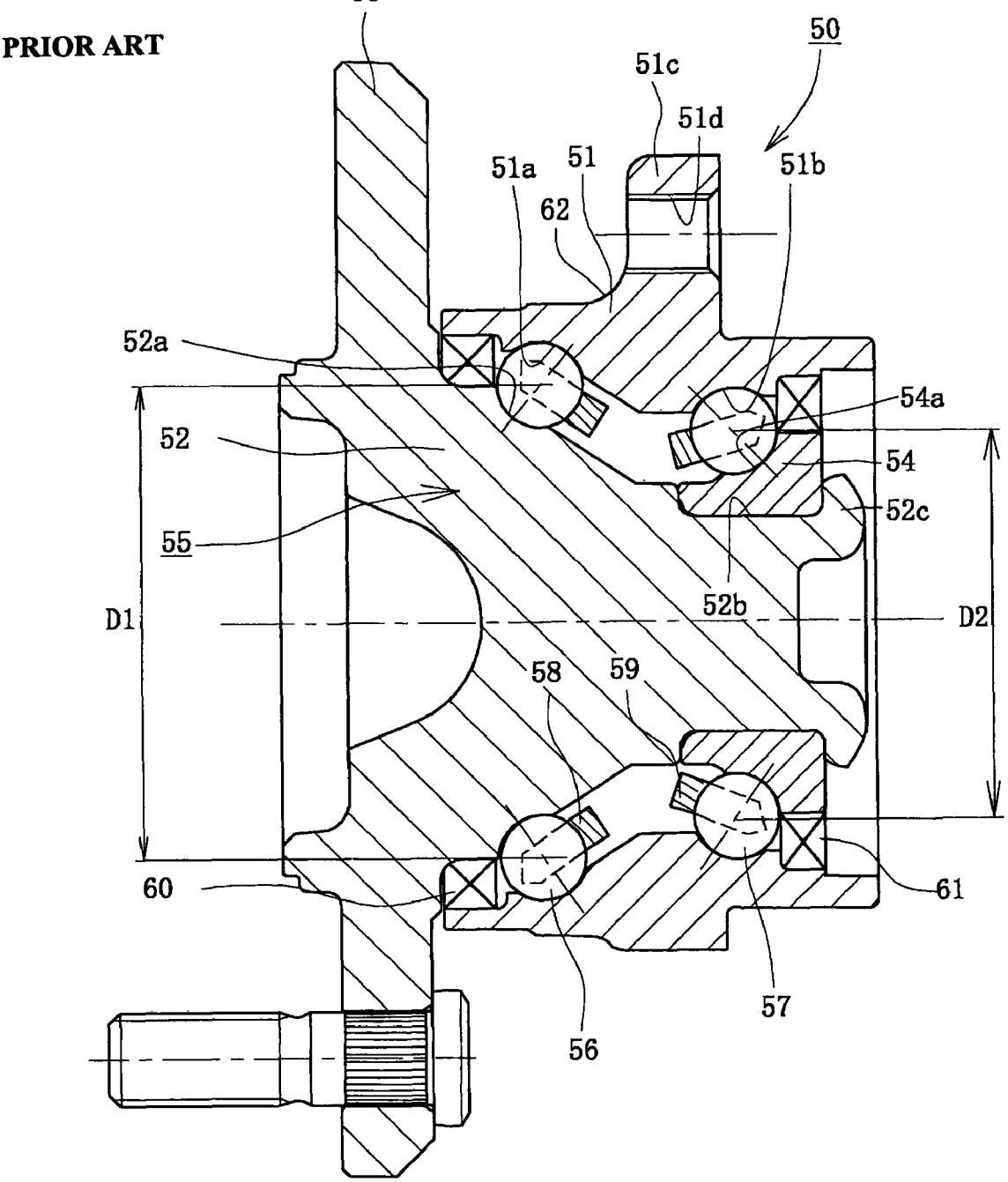
[Fig 11]
PRIOR ART

WHEEL BEARING APPARATUS

CROSS-REFERENCE TO RELATED APPLICATIONS

This application is a continuation of International Application No. PCT/JP2007/000944, filed Aug. 31, 2007, which claims priority to Japanese Application Nos. 2006-237136, filed Sep. 1, 2006; 2006-307601, filed Nov. 14, 2006; and 2006-348842, filed Dec. 26, 2006. The disclosures of the above applications are incorporated herein by reference.

FIELD

The present disclosure relates to a vehicle wheel bearing apparatus and, more particularly, to a vehicle wheel bearing apparatus that can increase the bearing rigidity as well as reduce the weight and size of the wheel bearing apparatus.

BACKGROUND

Usually, a vehicle bearing apparatus is adapted to freely rotatably support a wheel hub to mount the wheel via a rolling bearing. An inner ring rotation type is adopted for a driving wheel and both inner ring rotation and outer ring rotation types are adopted for a driven wheel. A double row angular contact ball bearing is widely used in such a bearing apparatus. Reasons for this is that it has a desirable bearing rigidity, high durability against misalignment and small rotation torque required for fuel consumption. The double row angular contact ball bearing has a plurality of balls interposed between a stationary ring and a rotational ring. The balls are contacted by the stationary and rotational rings at a predetermined contact angle.

The vehicle wheel bearing apparatus is broadly classified into a first through fourth generation structure. A first generation structure includes a wheel bearing with a double row angular contact ball bearing fit between a knuckle forming part of a suspension and a wheel hub. A second generation structure includes a body mounting flange or a wheel mounting flange directly formed on the outer circumference of an outer member. A third generation structure includes one of the inner raceway surfaces directly formed on the outer circumference of the wheel hub. A fourth generation structure includes the inner raceway surfaces directly formed on the outer circumferences of the wheel hub and a constant velocity universal joint. In the description below, the term "outer side" (left hand side in the drawings) of the apparatus denotes a side that is positioned outside of the vehicle body. The term "inner side" (right hand side in the drawings) of the apparatus denotes a side that is positioned inside of the body when the bearing apparatus is mounted on the vehicle body.

In the prior art wheel bearing apparatus formed with a double row rolling bearing, the bearing arrangements in both the left and right rows are the same. Thus, it has sufficient rigidity during straight way running. However, optimum rigidity cannot always be obtained during curved way running. Accordingly, the positional relationship between the wheels and the bearing apparatus is usually designed so that the weight of the vehicle acts on substantially the middle between the rows of bearing balls during straight way running. However, larger radial loads and larger axial loads are applied onto the vehicle axles, on the side opposite, during running in a curved direction (i.e. axles of the left hand side of vehicle when right hand curving). Accordingly, it is effective to have a larger rigidity of the bearing row on the outer side than the inner side of the bearing row in order to improve the durability and strength of the bearing apparatus. Thus, the vehicle wheel bearing apparatus shown in FIG. 11 is known to have a high rigidity without enlargement of the bearing apparatus.

The vehicle wheel bearing apparatus 50 is formed by a double row angular contact ball bearing including an outer member 51 integrally formed, on its outer circumference, with a body mounting flange 51c to be mounted on a knuckle (not shown) of a vehicle. Its inner circumference includes double row outer raceway surfaces 51a, 51b. An inner member 55 includes a wheel hub 52 with a wheel mounting flange 53 integrally formed at one end to mount a wheel (not shown). One inner raceway surface 52a is formed on its outer circumference opposite to one 51a of the double row outer raceway surfaces 51a, 51b. A cylindrical portion 52b axially extends from the inner raceway surface 52a. An inner ring 54 is fit onto the cylindrical portion 52b. Its outer circumference has the other inner raceway surface 54a opposite to the other raceway surface 51b of the double row outer raceway surfaces 51a, 51b. Double row balls 56, 57 are freely rollably contained between the outer raceway surfaces 51a, 51b and inner raceway surfaces 52a, 54a of the inner member 55. Cages 58, 59 rollably hold the balls 56, 57.

The inner ring 54 is axially immovably secured by a caulked portion 52c. The caulked portion 52c is formed by plastically deforming the cylindrical portion 52b of the wheel hub 52 radially outward. Seals 60, 61 are mounted in annular openings formed between the outer member 51 and the inner member 55. The seals 60, 61 prevent the leakage of grease contained within the bearing apparatus and the entering of rain water or dusts into the bearing apparatus from the outside.

A pitch circle diameter D1 of the outer side ball group 56 is set larger than a pitch circle diameter D2 of the inner side ball group 57. Accordingly, the diameter of the inner raceway surface 52a of the wheel hub 52 is larger than that of the inner raceway surface 54a of the inner ring 54. The outer raceway surface 51a of the outer side of the outer member 51 is larger than that of the outer raceway surface 51b of the inner side of the outer member 51. Also, the number of outer side balls 56 is larger than that of the inner side balls 57. By setting the pitch circle diameter D1 of the outer side larger than the pitch circle diameter D2 of the inner side (D1>D2), it is possible to obtain a large rigidity of the bearing apparatus 50 that extends its life. Patent Document 1: Japanese Laid-open Patent Publication No. 108449/2004

In the prior art bearing apparatus 50, the pitch circle diameter D1 of the outer side ball group 56 is set larger than the pitch circle diameter D2 of the inner side ball group 57. Thus, the number of the balls of outer side is larger than the number of balls of inner side. This is to increase the bearing rigidity. However, a problem exists on how to effectively increase the bearing rigidity while suppressing an increase of the weight of the bearing apparatus.

Also in the prior art bearing apparatus 50, a root portion 62 of the of the body mounting flange 51c of the outer member 51 interferes with an internal thread portion 51d of the body mounting flange 51c when the outer side wall thickness of the outer member 51 is increased in order to increase its rigidity corresponding to the enlargement of the pitch circle diameter D1 of the outer side ball group 56. This makes tapping of the internal thread portion 51d difficult and thus the increase of rigidity of the outer member 51 is limited.

SUMMARY

It is, therefore, an object of the present disclosure to provide a vehicle wheel bearing apparatus that can increase the bearing rigidity and simultaneously reduce the weight and size of the bearing apparatus.

It is another object of the present disclosure to provide a vehicle wheel bearing apparatus that can reduce the generation of stress as well as keep the sealing performance at the root portion of the wheel mounting flange.

In order to achieve the object, a vehicle wheel bearing apparatus comprises an outer member formed, on its inner circumference, with double row outer raceway surfaces. An inner member includes a wheel hub and at least one inner ring fit onto a cylindrical portion of the wheel hub or an outer raceway surface of a constant velocity universal joint. The wheel hub has an integrally formed wheel mounting flange at its one end. A cylindrical portion axially extends from the wheel mounting flange. The inner member is formed, on its outer circumference, with double row inner raceway surfaces arranged opposite to the double row outer raceway surfaces. Double row rolling element groups are freely rollably contained between said inner and outer raceway surfaces of the inner member and the outer member. The size of each rolling element of the group near the wheel mounting flange is different from that of each rolling element of the group away from the wheel mounting flange. The number of rolling elements of the group near to the wheel mounting flange is larger than that of the rolling elements of the group away from the wheel mounting flange.

This makes it possible to provide a vehicle wheel bearing apparatus having a structure of the first through fourth generation where the size of each rolling element of the group near to the wheel mounting flange is different from that of each rolling element of the group away from the wheel mounting flange. The number of rolling elements of the group near to the wheel mounting flange is larger than the number of rolling elements of the group away from the wheel mounting flange. Accordingly, this increases the bearing rigidity and reduces the weight and size of the wheel bearing apparatus.

It is preferable that the pitch circle diameter of the ball element group near the wheel mounting flange is larger than that of the double row ball group away from the wheel mounting flange. This makes it possible to further increase the bearing rigidity of the outer side of the bearing apparatus.

It is also preferable that the size of each rolling element of the group near to the wheel mounting flange is larger than that of each rolling element of the group away from the wheel mounting flange. Alternatively, the size of each rolling element of the group near to the wheel mounting flange is smaller than that of each rolling element of the group away from the wheel mounting flange.

It is also preferable that the rolling elements are balls. Alternatively, the rolling elements are tapered rollers. The diameter of each tapered roller of the group near to the wheel mounting flange is larger than the diameter of each tapered roller of the group away from the wheel mounting flange. The length of each tapered roller of the group near to the wheel mounting flange is larger than the length of each tapered roller of the group away from the wheel mounting flange.

It is preferable that a larger flange to guide the tapered rollers is not formed on the larger diameter side of the inner raceway surface of the wheel hub. It is formed on the larger diameter side of the outer raceway surface of the outer member. This makes it easy to forge and cut the wheel hub, to reduce the stress concentration generated in the wheel hub, and to improve the strength and durability of the bearing apparatus.

It is preferable that the outer member is integrally formed, on its outer circumference, with a body mounting flange to be mounted on a knuckle, forming a portion of a suspension apparatus. A smooth annular groove with a circular-arc cross-section and a predetermined depth is formed on its outer side root portion. Thus, the interference between the corner R of the root portion and the internal thread of the body mounting flange can be prevented by the provision of the annular groove although the outer diameter of the outer member of the outer side is increased by enlargement of the pitch circle diameter of the rolling element group of the outer side. Accordingly, it is possible to perform tapping of the internal thread portion of the body mounting flange and to increase the rigidity of the outer member while keeping the desired wall thickness of the outer member.

It is preferable that the body mounting flange is formed as a plurality of projections around the outer circumference of the outer member. Smooth circumferential grooves, each having a circular-arc cross-section, are formed on the outer circumference between the projected body mounting flanges. The circumferential grooves communicate with the annular groove. This makes it possible to reduce the weight of the outer member without reducing its rigidity.

It is preferable that seals are mounted in annular space openings formed between the outer member and the inner member. An outer side seal of these seals comprises a contacting seal mounted on the outer member. The seal has a tip end in sliding contact with the wheel hub. A labyrinth seal gap is formed between the outer member and the wheel hub. The outer circumference region of the wheel hub, from an outer side end portion of the shaft-shaped portion of the wheel hub to an inner side side face of the wheel mounting flange, comprises a base portion with a diameter increasing toward the outer side. A cross-section corner surface is continuous on the base portion. A circular-arc root surface is continuous to an inner side side face of the wheel mounting flange. The outer side inner circumferential surface and the end face of the outer member are arranged proximate to the circular-arc corner surface. A gap of L-shaped cross-section, forming the labyrinth gap, is formed between the circular-arc corner surface and the outer member. According to this structure, the labyrinth seal gap is formed with an L-shaped cross-section and thus the sealing performance can be improved. That is, when the cross-section of the labyrinth gap is L-shape, a bent portion is formed and thus muddy water tending to enter into the bearing apparatus is affected by an action of being once stopped at the bent portion. Thus, it is appreciated that muddy water is prevented from entering into the sealed portion of the bearing apparatus. In addition, the outer circumference region of the wheel hub, from an outer side end portion of the shaft-shaped portion of the wheel hub to an inner side side face of the wheel mounting flange, has a base portion with a diameter increasing toward the outer side. A circular-arc corner surface is continuous with the base portion. A circular-arc root surface is continuous with an inner side side face of the wheel mounting flange. Accordingly, this reduces the stress concentration generated in the circular-arc root portion of the wheel mounting flange. Thus, this improves the strength and durability of the bearing apparatus.

It is also preferable that the inner member includes the wheel hub and the inner ring. The wheel hub has, on its outer circumference, one inner raceway surface opposite to one outer raceway surface of the double row outer raceway surfaces. The cylindrical portion axially extends from the inner raceway surface, via the shaft-shaped portion. The inner ring is press fit onto the cylindrical portion of the wheel hub. Its outer circumference includes the other inner raceway surface opposite to the other outer raceway surface of the double row outer raceway surfaces. A substantially conical recess is formed on the end portion at wheel mounting flange side of the wheel hub. The depth of the recess extends to at least near the shaft-shaped portion of the wheel hub. The outline configuration of the wheel hub is formed so that the wall thickness of the outer side end of the wheel hub is substantially constant corresponding to the configuration of the recess. This solves the antinomic problem of reducing the weight and size of the bearing apparatus while increasing its rigidity.

It is also preferable that the inner ring is axially secured by an applied predetermined bearing pre-pressure by a caulked portion. The caulked portion is formed by plastically deforming the end portion of the cylindrical portion of the wheel hub radially outward. This makes it possible to reduce the weight and size of the bearing apparatus and to provide a self-retaining structure to maintain the initially set pre-pressure for a long term.

According to the vehicle wheel bearing apparatus of the present disclosure, it comprises an outer member formed, on its inner circumference, with double row outer raceway surfaces. An inner member includes a wheel hub and at least one inner ring fit onto a cylindrical portion of the wheel hub or an outer raceway surface of a constant velocity universal joint. The wheel hub has an integrally formed wheel mounting flange at its one end. A cylindrical portion axially extends from the wheel mounting flange. The inner member is formed, on its outer circumference, with double row inner raceway surfaces arranged opposite to the double row outer raceway surfaces. Double row rolling element groups are freely rollably contained between the inner and outer raceway surfaces of the inner member and the outer member. The size of each rolling element of the group near to the wheel mounting flange is different from that of each rolling element of the group away from the wheel mounting flange. The number of rolling elements of the group near to the wheel mounting flange is larger than the number of rolling elements of the group away from the wheel mounting flange. Thus, it is possible to provide a vehicle wheel bearing apparatus that can increase the bearing rigidity and simultaneously reduce the weight and size of the bearing apparatus.

In order to carry out the present disclosure, a vehicle wheel bearing apparatus comprises an outer member formed, on its outer circumference, with a body mounting flange to be mounted on a knuckle of a vehicle. Its inner circumference includes double row outer raceway surfaces. An inner member includes a wheel hub and an inner ring. The wheel hub has an integrally formed wheel mounting flange at its one end. One inner raceway surface is formed on the outer circumference of the wheel hub opposite to one of the double row outer raceway surfaces. A cylindrical portion axially extends from the inner raceway surface. The inner member is press fit onto the cylindrical portion of the wheel hub. Its outer circumference includes the other double row inner raceway surface opposite to the other of the double row outer raceway surfaces. Double row ball groups are freely rollably contained between said inner and outer raceway surfaces of the inner member and the outer member. The pitch circle diameter of the ball group near to the wheel mounting flange is larger than the pitch circle diameter of the ball group away from the wheel mounting flange. The diameter of each ball of the group near to the wheel mounting flange is smaller than that of each ball of the group away from the wheel mounting flange. The number of the balls of the group near to the wheel mounting flange is larger than the number of balls of the group away from the wheel mounting flange. A substantially conical recess is formed on the end portion at wheel mounting flange side of the wheel hub. The depth of the recess extends to at least near the shaft-shaped portion of the wheel hub. The outline configuration of the wheel hub is formed so that the wall thickness of the outer side end of the wheel hub is substantially constant corresponding to the configuration of the recess.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of a vehicle wheel bearing apparatus.

FIG. 2 is a longitudinal section view of a second embodiment of a vehicle wheel bearing apparatus.

FIG. 3 is a longitudinal section view of a third embodiment of a vehicle wheel bearing apparatus.

FIG. 4 is a side-elevation view of FIG. 3.

FIG. 5 is a partially enlarged view of FIG. 3.

FIG. 6 is a longitudinal section view of a fourth embodiment of a vehicle wheel bearing apparatus.

FIG. 7 is an enlarged view of an encircled portion A in FIG. 6.

FIG. 8 is a longitudinal section view of a fifth embodiment of a vehicle wheel bearing apparatus.

FIG. 9 is an enlarged view of an encircled portion B in FIG. 8.

FIG. 10 is a graph showing a relation between the circular-arc ratio of labyrinth corner and the generated stress ratio.

FIG. 11 is a longitudinal section view of a prior art vehicle wheel bearing apparatus.

DETAILED DESCRIPTION

Preferable embodiments of the present disclosure will be hereinafter described with reference to the drawings.

FIG. 1 is a longitudinal section view of a first embodiment of a vehicle wheel bearing apparatus.

The vehicle bearing apparatus shown in FIG. 1 is a third generation type used for a driven wheel. It includes an inner member 1, an outer member 2, and double row ball groups 3, 4 rollably contained between the inner and outer members 1, 2. The inner member 1 includes the wheel hub 5 and an inner ring 6 press fit onto the wheel hub 5 with a predetermined interference.

The wheel hub 5 is integrally formed with a wheel mounting flange 7 at its one end. One (outer side) inner raceway surface 5a of a circular-arc cross-section is on its outer circumference. A cylindrical portion 5b extends from the inner raceway surface 5a through a shaft-shaped portion 8. Hub bolts 7a are arranged on the wheel mounting flange 7 equidistantly along the periphery of the wheel mounting flange 7. Circular apertures 7b are formed between the hub bolts 7a. The circular apertures 7b contribute not only to a reduction of the weight of the bearing apparatus but to passage of any fastening tool used to assemble and disassemble the bearing apparatus.

The inner ring 6 is formed, on its outer circumference, with the other (inner side) inner raceway surface 6a, of a circular-arc cross-section. The inner ring 6 is adapted to be press fit onto the cylindrical portion 5b of the wheel hub 5 to form a double row angular contact ball bearing of back-to-back duplex type. The inner ring 6 is axially secured by a caulked portion 5c that is formed by plastically deforming the end of the cylindrical portion 5b. The inner ring 6 and balls 3, 4 are made of high carbon chrome steel such as SUJ2. They are hardened to their core by dip quenching to have a surface hardness of 58~64 HRC.

The wheel hub 5 is made of medium carbon steel including carbon of 0.40~0.80% by weight such as S53C. It is hardened by high frequency induction quenching so that a region, including the inner raceway surface 5a from the inner side base 7c of the wheel mounting flange 7 to the cylindrical portion 5b, has a surface hardness of 58~64 HRC. The caulked portion 5c remains as is with its surface hardness after forging. Accordingly, the wheel mounting flange 7 has a sufficient mechanical strength against rotary bending loads applied thereto. The anti-fretting strength of the cylindrical portion 5b at a region press fit by the inner ring 6 can be improved. Also, the plastic deforming work of the caulked portion 5c can be carried out without any micro crack during the caulking process.

The outer member 2 is integrally formed, on its outer circumference, with a body mounting flange 2c to be mounted on a knuckle (not shown) of a vehicle. Its inner circumference includes an outer side outer raceway surface 2a, of circular-arc cross-section, opposite to the inner raceway surface 5a of the wheel hub 5 and an inner side outer raceway surface 2b, of a circular-arc cross-section, opposite to the inner raceway surface 6a of the inner ring 6. Double row ball groups 3, 4 are contained between these outer and inner raceway surfaces. They are rollably held by cages 9, 10.

The outer member 2 is made of medium carbon steel including carbon of 0.40~0.80% by weight such as S53C. The double row outer raceway surfaces 2a, 2b are hardened by high frequency induction quenching to have a surface hardness of 58~64 HRC. Seals 11, 12 are mounted within annular space openings formed between the outer member 2 and the inner member 1. The seals 11, 12 prevent leakage of grease contained in the bearing and the entering of rain water and dusts into the bearing from the outside.

According to a preferred embodiment, a pitch circle diameter PCDo of the outer side ball group 3 is set larger than a pitch circle diameter PCDi of the inner side ball group 4. Thus, the outer side outer raceway surface 2a of the outer member 2 is formed with a larger diameter than the diameter of the inner side outer raceway surface 2b. In addition, the number of balls Zo of outer side ball group 3 is set larger than the number of balls Zi of inner side ball group 4. The diameter (do) of each ball 3 of the outer side ball group is set larger than the diameter (di) of each ball 4 of the inner side ball group. These relationships between the outer side and inner side balls 3, 4 are PCDo>PCDi, Zo>Zi, and do>di that enables an increase in the bearing rigidity and thus extend the life of the wheel bearing apparatus.

The outline configuration of the wheel hub 5 has a region from the groove bottom of the inner raceway surface 5a to a counter portion 13. It has a region axially extending from the counter portion 13 to a stepped portion 8a. The stepped portion 8a has a tapered surface via an axially extending shaft shaped portion 8. The cylindrical portion 5b extends from the stepped portion 8a, via a shoulder portion 8b against which the inner ring 6 is abutted. A substantially conical recess 14 is formed on the outer side end of the wheel hub 5. The depth of the recess 14 extends to at least near the shaft-shaped portion 8 beyond the inner raceway surface 5a. The recess 14 provides the wall thickness of the outer side end of the wheel hub 5 to be substantially constant corresponding to the configuration of the recess.

On the outer member 2, the outer side outer raceway surface 2a is formed larger than the inner side outer raceway surface 2b. This is due to the difference in the pitch circle diameters PCDo, PCDi. A cylindrical shoulder portion 15 axially extends from the outer side outer raceway surface 2a. The shoulder portion 15 continues to a cylindrical shoulder portion 16 of a smaller diameter size via a stepped portion 15a of a circular-arc cross-section and arrives at the inner side outer raceway surface 2b. In addition, the outer member 2 is formed so that a bottom diameter of the inner side outer raceway surface 2b is substantially the same as an inner diameter of the outer diameter side shoulder portion 15.

The pitch circle diameter PCDo of the ball element group 3 of the outer side is larger than the pitch circle diameter PCDi of the double row ball group 4 of the inner side. The number of balls Zo of rolling element group 3 of the outer side is larger than the number of balls Zi of rolling element group 4 of the inner side. The diameter (do) of each ball 3 of the outer side group is larger than the diameter di of each ball 4 of the inner side group. Thus, it is possible to effectively reduce the weight and size of the wheel bearing apparatus and also to increase the outer side bearing rigidity as compared with the inner side bearing rigidity. This extends the life of the wheel bearing apparatus. In addition, since the substantially conical recess 14 is formed on the outer side end portion of the wheel hub 5 and the wall thickness of the outer side end of the wheel hub 5 is substantially constant, corresponding to the configuration of the recess, it is possible to solve the antinomic problem of reducing the weight and size of the bearing apparatus while increasing its rigidity.

FIG. 2 is a longitudinal section view showing a second embodiment of a wheel bearing apparatus for a vehicle of the present disclosure. The same reference numerals are used to designate the same parts as those having the same functions used in the first embodiment.

The vehicle wheel bearing apparatus shown in FIG. 2 is a third generation type used for a driven wheel. It includes an inner member 17, an outer member 18, and double rows of tapered rollers 19, 20 that are freely rollably contained between the inner and outer members 17, 18. The inner member 17 includes the wheel hub 21 and an inner ring 22 press fit onto the wheel hub 21 with a predetermined interference.

The wheel hub 21 is integrally formed with a wheel mounting flange 7 at its one end. One (outer side) tapered inner raceway surface 21a is formed on the outer circumference. A cylindrical portion 5b extends from the inner raceway surface 21a through an axially extending shaft-shaped portion 8. It should be noted that any conventional larger flange to guide the tapered rollers 19 is not formed on the larger diameter side of the inner raceway surface 21a of the wheel hub 21. Instead, a larger flange 23 is formed on the outer member 18 as described. In addition, any smaller flange to hold the tapered rollers 19 is not formed on the smaller diameter side of the inner raceway surface 21a. The outer circumference of the wheel hub 21 is formed with a circular-arc base portion 7c at the root of the wheel mounting flange 7. The inner raceway surface 21a smoothly extends from the base portion 7c. A shaft shaped portion 8 axially extends from the inner raceway surface 21a. Also, a circular-arc stepped portion 8a, a shoulder portion 8b, and finally the cylindrical portion 5b axially extend from the shaft portion 8. Such a configuration not only enables easy forging and cutting of the wheel hub 21, but also reduces stress concentrations caused in the wheel hub 21 and thus improves the strength and durability.

The inner ring 22 is formed on its outer circumference with another (inner side) inner raceway surface 22a having a tapered cross section. A larger flange 22b to guide the tapered rollers 20 is formed on a larger diameter side of the inner raceway surface 22a. A smaller flange 22c to prevent falling out of the tapered rollers 20 from the inner raceway surface 22a is formed on a smaller diameter side of the inner raceway surface 22a. The inner ring 22 is press fit onto the cylindrical portion 5b of the wheel hub 21 via a predetermined interference. It is axially secured by a caulked portion 5c formed by plastically deforming the end of the cylindrical portion 5b with an applied predetermined pre-load. Accordingly, it is possible to reduce the weight and size of the bearing apparatus and to form a self-retaining structure to keep an initially set pre-load for a long term.

The outer member 18 is integrally formed on its outer circumference with a body mounting flange 2c. Its inner circumference includes an outer side tapered outer raceway surface 18a opposite to the inner raceway surface 21a of the wheel hub 21 and an inner side tapered outer raceway surface 18b opposite to the inner raceway surface 22a of the inner ring 22. In this embodiment, the outer member 18 is formed with a larger flange 23 to guide the outer side tapered rollers 19. That is, the outer diameter side of the outer side outer raceway surface 18a of the outer member 18 is integrally formed with the larger flange 23 to guide the tapered rollers 19. This makes it possible to reduce stress concentration to the wheel hub 21 loaded via the tapered rollers 19. Thus, fatigue of the wheel hub 21, although a large moment load is applied to the wheel mounting flange 7, is limited to assure the strength and durability of the wheel bearing apparatus.

The outer member 18 is made of medium carbon steel including carbon of 0.40~0.80% by weight such as S53C. The larger flange 23 and the double row outer raceway surfaces 18a, 18b are hardened by high frequency induction quenching to have a surface hardness of 58~64 HRC. A plurality of tapered rollers 19, 20 are freely rollably contained via cages 24, 25 between the raceway surfaces 18a, 21a; 18b, 22a. Seal 11 and slinger 26 are mounted within annular openings formed between the outer member 18 and inner member 17. The seals 11 and slinger 26 prevent leakage of grease contained in the bearing and the entering of rain water and dusts into the bearing from the outside. A magnetic encoder is integrally adhered to the outer side slinger 26.

The wheel hub 21 is made of medium carbon steel including carbon of 0.40~0.80% by weight such as S53C. It is hardened by high frequency induction quenching so that a region, from an inner side base portion 7c (to which an outer side seal 11 contacts) of the wheel mounting flange 7 to the inner raceway surface 21a, shaft shaped portion 8, stepped portion 8a, shoulder portion 8b and finally the cylindrical portion 5b, has a surface hardness of 58~64 HRC. The inner ring 22 and the tapered rollers 19, 20 are made of high carbon chrome steel such as SUJ2. They are hardened to their core by dip quenching to have a surface hardness of 58~4 HRC.

In this embodiment, a pitch circle diameter PCDo of the outer side tapered roller group 19 is set larger than a pitch circle diameter PCDi of the inner side tapered roller group 20 (PCDo>PCDi). The number of rollers Zo of outer side tapered roller group 19 is set larger than the number of rolls Zi of inner side tapered roller group 20 (Zo>Zi). The diameter Do of each tapered rollers 19 of the outer side group is set larger than the diameter Di of each tapered roller 20 of the inner side taper roller group (Do>Di). The length Lo of each tapered roller 19 of the outer side group is set larger than the length Li of each tapered roller 20 of the inner side taper roller group (Lo>Li). These relationships between the outer side and inner side tapered rollers 19, 20 enable a further reduction of the inner side size of the outer member 18. This further increases the bearing rigidity of the outer side as compared with that of the inner side while suppressing an increase of weight and thus extends the life of the wheel bearing apparatus. In addition, it is possible to increase the bearing rigidity of the inner side by setting the length Li of the inner side tapered roller 20 longer than the length Lo of the outer side tapered roller 19 in accordance with the inner side bearing space in order to increase the inner side bearing rigidity.

A substantially conical recess 14 is formed on the outer side end portion of the wheel hub 21. The depth of the recess 14 extends to at least near the shaft-shaped portion 8 beyond the inner raceway surface 21a. Thus, the wall thickness of the outer side end of the wheel hub 21 is substantially constant. This solves the antinomic problem of reducing the weight and size of the bearing apparatus while increasing its rigidity FIG. 3 is a longitudinal section view of a third embodiment of a vehicle wheel bearing apparatus. FIG. 4 is a side-elevation view of FIG. 3. FIG. 5 is a partially enlarged view of FIG. 3. The same reference numerals are used to designate the same parts as those having the same functions used in the previous embodiments.

The vehicle wheel bearing apparatus shown in FIG. 3 is a third generation type used for a driven wheel. It includes an inner member 27, an outer member 28, and double rows of ball groups 3a, 4 freely rollably contained between the inner and outer members 27, 28. The inner member 27 includes the wheel hub 29 and an inner ring 6 press fit onto the wheel hub 29 with a predetermined interference.

The wheel hub 29 is integrally formed with a wheel mounting flange 7 at its outer side end. One (outer side) inner raceway surface 29a is formed on the outer circumference. A cylindrical portion 5b extends from the inner raceway surface 29a through an axially extending shaft-shaped portion 29b.

An axially extending substantially conical recess 14 is formed by forging on the outer side end portion of the wheel hub 29b. The depth of the recess 14 extends to at least near the shaft-shaped portion 29b beyond a groove bottom of the outer side inner raceway surface 29a. Thus, the wall thickness of the outer side of the wheel hub 29 is substantially constant.

The wheel hub 29 is made of medium carbon steel including carbon of 0.40~0.80% by weight such as S53C. It is hardened by high frequency induction quenching so that a region, from a base portion 7c of the wheel mounting flange 7 to the cylindrical portion 5b via the inner raceway surface 29a, has a surface hardness of 58~64 HRC. This improves the mechanical strength against rotary bending loads applied onto the wheel mounting flange 7. The anti-fretting strength of the cylindrical portion 5b at a region press fit by the inner ring 6 is improved. Thus, the plastically deforming of the caulked portion 5c can also be carried out without any micro crack during the caulking process.

The outer member 28 is integrally formed, on its outer circumference, with a body mounting flange 28c to be mounted on a knuckle (not shown) of a vehicle. Its inner circumference includes an outer side outer raceway surface 28a opposite to the inner raceway surface 29a of the wheel hub 29 and an inner side outer raceway surface 2b opposite to the inner raceway surface 6a of the inner ring 6. Double row ball groups 3a, 4 are contained between these outer and inner raceway surfaces. They are rollably held by cages 9a, 10.

The outer member 28 is made of medium carbon steel including carbon of 0.40~0.80% by weight such as S53C. The double row outer raceway surfaces 28a, 2b are hardened by high frequency induction quenching to have a surface hardness of 58~64 HRC. Although it is illustrated in this embodiment as a double row angular contacting ball bearing using balls as the rolling elements 3a, 4, it is possible to use a double row tapered roller bearing using tapered rollers. In addition this embodiment can be applied not only to the third generation structure of the driven wheel side, but also to the second or fourth generation structure.

In this embodiment, a pitch circle diameter PCDo of the outer side rolling element group 3a is set larger than a pitch circle diameter PCDi of the inner side rolling element group 4 (PCDo>PCDi). The diameter (do) of each rolling element 3a of the outer side group is set smaller than the diameter di of each rolling element 4 of the inner side group (do<di). Due to the differences in the pitch circle diameter PCDo, PCDi and the diameter of the rolling elements (do), (di), the number of balls Zo of outer side rolling element group 3a is set larger than the number of balls Zi of inner side rolling element group 4 (Zo>Zi). These relationships between the outer side and inner side rolling elements 3a, 4 further increases the bearing rigidity of the outer side as compared with that of the inner side while suppressing an increase of the weight and thus extends the life of the wheel bearing apparatus. Although it is illustrated as a wheel bearing apparatus where the size of the rolling elements 3a, 4 is different in the outer side and the inner side, the present disclosure can be applied to a wheel bearing apparatus having rollers with the same size in both rows.

As shown in FIG. 4, in the present embodiment, the body mounting flange 28c is formed as a plurality of projections positioned around the circumference of the outer member 28. Circumferential grooves 30 are formed around the outer member 28 between the body mounting flanges 28c. An annular groove 32 is formed on an outer side root 31 of the body mounting flanges 28c. These circumferential grooves 30 and the annular groove 32 communicate with each other to reduce the weight of the outer member 28 without reducing its rigidity.

As shown in FIG. 5, the annular groove 32 is formed with a smooth circular-arc cross-section of a predetermined depth at the outer side root portion 31 of the body mounting flanges 28c. This prevents interference between the corner R of the root portion 31 and internal thread portions 28b of the body mounting flanges 28c. The annular groove 32 enables tapping work of the internal thread portions 28b to carry out on the body mounting flange 28c. The outer side diameter of the outer member 28 is increased due to the enlargement of the pitch circle diameter PCDo of the outer side rolling element group 3a. Thus, it is possible to increase the rigidity of the outer member 28 while keeping a desired wall thickness of the outer member 28.

FIG. 6 is a longitudinal section view of a fourth embodiment of a vehicle wheel bearing apparatus. FIG. 7 is an enlarged view of the encircled portion A in FIG. 6. The same reference numerals are used to designate the same parts as those having the same functions used in the previous embodiments.

The vehicle wheel bearing apparatus shown in FIG. 6 is a third generation type of an inner ring rotation type used for a driven wheel. It includes an inner member 33, an outer member 34, and double rows of ball groups 4, 4 freely rollably contained between the inner and outer members 33, 34. The inner member 33 includes the wheel hub 35 and an inner ring 6 press fit onto the wheel hub 35 with a predetermined interference.

The wheel hub 35 is integrally formed with a wheel mounting flange 7 at its outer side end. One (outer side) inner raceway surface 35a is formed on the outer circumference. A cylindrical portion 5b extends from the inner raceway surface 35a through an axially extending shaft-shaped portion 35b.

The outer member 34 is integrally formed, on its outer circumference, with a body mounting flange 34c to be mounted on a knuckle (not shown) of a vehicle. Its inner circumference includes an outer side outer raceway surface 34a opposite to the inner raceway surface 35a of the wheel hub 35 and an inner side outer raceway surface 2b opposite to the inner raceway surface 6a of the inner ring 6. Double row rolling element groups 4, 4 are freely rollably contained, via cages 9b, 10, between these raceway surfaces. Seals 36, 12 are mounted within annular openings formed between the outer member 34 and inner member 33. The seals 36, 12 prevent leakage of grease contained in the bearing and the entering of rain water and dusts into the bearing from the outside.

As shown in the enlarged view of FIG. 7, the outer side seal 36 includes a contacting seal 37 mounted on the outer member 34. The seals tip is in contact with the base portion 7c of the wheel hub 35. A labyrinth seal gap 38 is formed between the outer member 34 and the wheel hub 35.

The contacting seal 37 includes a metal core 39 including a circumferential portion 39a and a metal core 39, having an upstanding portion 39b, with an L-shaped cross-section. An elastic member 40 is adhered to the metal core 39. The contacting seal 37 can be mounted on the outer member 34 with the circumferential portion 39a of the metal core 39 being fit into the outer side inner circumference of the outer member 34.

The outer side end portion of the shaft-shaped portion 35b of the wheel hub 35 and the outer circumference portion from the outer side edge of the inner raceway surface 35a to the inner side side face 7d of the wheel mounting flange includes a circular-arc base portion 7c. The base portion 7c has a gradually increasing diameter toward the outer side. A corner surface 41 is continuous to the base portion 7c. It has a circular-arc cross-section. A circular-arc root surface 42 is continuous from the corner surface 41 to the flat side face 7d of the wheel mounting flange 7.

The elastic member 40 of the contacting seal 37 has three sealing lips 40a, 40b, 40c. The tips are directed toward a sealing surface, the base portion 7c of the wheel hub 35. The sealing lips 40b, 40c, other than the radially most inside sealing lip 40a relative to the bearing space between the outer member 34 and the wheel hub 35, are dust lips to prevent dusts and muddy water from entering into the bearing apparatus. They are formed so that they extend radially outward into the bearing space. These sealing lips 40b, 40c contact the base portion 7c via a predetermined interference. The radially most inside sealing lip 40a is a grease lip to prevent the out flow of grease sealed within the bearing apparatus. It is formed so that its tip extends toward the radially inside of the bearing space. The tip contacts the base portion 7c via a predetermined interference.

The labyrinth seal gap 38 is an L-shaped cross-section gap formed between the outer side end face and the inner circumference of the outer member and the circular-arc corner surface 41 of the wheel hub 35.

A difference in radius (R2−R1) is set so that a ratio relative to a radius of curvature "r" of the corner surface 41 i.e. (R2−R1)/r is within a range 0.75~1.25. That is, it has a dimensional relation as followings:

$$0.75 \leq (R2-R1)/r \leq 1.25 \quad (1)$$

wherein R1 is a radius of a starting point of the circular-arc labyrinth corner, i.e. a minimum radius of the circular-arc corner surface 41 of the wheel hub 35 and R2 is a radius of a starting point of the circular-arc root surface 42, i.e. a minimum radius of the circular-arc root surface 42 of the wheel hub 35.

According to the wheel bearing apparatus having such a structure, the outer circumferential surface of the wheel hub 35 from the outer side end portion of the shaft-shaped portion 35 to the inner side side face 7d of the wheel mounting flange 7 include the base portion 7c with its radius increasing toward the outer side. The circular-arc corner surface 41 is continuous with the base portion 7c. The circular-arc root surface 42 is continuous with the inner side side face 7d of the wheel mounting flange 7. The labyrinth seal gap 38 is formed as an L-shaped cross-section gap formed between the outer side end face and inner circumference of the outer member and the circular-arc corner surface 41 of the wheel hub 35. This provides an excellent sealing performance. This is because the muddy water tending to enter into the portion sealed by the contacting seal 37 will be intercepted by the presence of a bend of the L-shaped cross-section. Thus, the muddy water dropped on a top portion of FIG. 7 tends to flow downward to the labyrinth seal gap 38, however, further flowing-down action will be stopped by the bend of the L-shaped cross-section.

In addition, the outer circumferential surface of the wheel hub 35 from the outer side end portion of the shaft-shaped portion 35 to the inner side side face 7d of the wheel mounting flange 7 includes the base portion 7c with its radius increasing toward the outer side. The circular-arc corner surface 41 is continuous to the base portion 7c. The circular-arc root surface 42 is continuous to the inner side side face 7d of the wheel mounting flange 7. The stress concentration at the root portion of the wheel mounting flange can be reduced when moment loads are applied onto the wheel bearing apparatus and thus the strength and durability are improved.

Further according to this embodiment, the difference in radius (R2−R1) is set so that a ratio relative to a radius of curvature "r" of the corner surface 41, i.e. (R2−R1)/r, is within a range 0.75~1.25 as described above. The sealing performance at the outer side end portion can be assured. Also, stress generated on the root of the wheel mounting flange 7 can be reduced.

Although the labyrinth seal gap 38 has an L-shaped cross-section, the entrance of muddy water will be expanded and thus the muddy water tends to easily flow into the bearing apparatus when a length in a radius direction of opposite surfaces relative to the outer member 34 is shortened. Thus, it is preferable that the ratio of the radius of curvature, i.e. (R2−R1)/r, is set at 0.75 or more. On the other hand, the gap between the circular-arc corner surface 41 and the outer side inner circumferential surface of the outer member 34 will be reduced. Thus, the interference therebetween would be caused when the radius of curvature "r" of the circular-arc corner surface 41 is increased. In this case, if the radius R1 of a starting point of the circular-arc labyrinth corner is reduced, the labyrinth seal gap 38 will be increased and thus sealability will be detracted.

The ratio of the radius of curvature can be obtained by increasing only the radius R1 of a starting point of the circular-arc labyrinth corner without changing the radius R2 of a starting point of the circular-arc root surface 42 and by reducing the difference in radius (R2−R1) of the radius R1 of a starting point of the circular-arc labyrinth corner and the radius R2 of a starting point of the circular-arc root surface 42. Thus, the stress caused on the circular-arc corner surface 41 can be distributed over the circular-arc root surface 42 and accordingly the stress can be reduced. Thus, the strength of the circular-arc corner surface 41 is increased by increasing the radius R1 of a starting point of the circular-arc labyrinth corner. Also, difference in strength of the circular-arc corner surface 41 and the circular-arc root surface 42 can be reduced. As the result of which the stress concentrated on the circular-arc corner surface 41 is distributed over the circular-arc root surface 42. Thus, the stress on the circular-arc corner surface 41 is reduced and the stress acting on the circular-arc root surface 42 having a room for strength is increased. Since the radius R2 of a starting point of the circular-arc root surface 42 is not increased, increase of weight of the wheel bearing apparatus can be wholly suppressed to a minimum.

One example of an analysis according to the finite element method will be hereinafter described with reference to Table 1 and FIG. 10.

TABLE 1

Stress analysis data

| Example of analysis | Radius of curvature r | Radius R1 | Radius R2 | Difference (R2 − R1) | Ratio (R2 − R1)/r | Ratio of generated stress |
|---|---|---|---|---|---|---|
| 1 | 1.2 | 37.6 | 39.65 | 2.05 | 1.71 | 1.00 |
| 2 | 1.2 | 38.1 | 39.65 | 1.55 | 1.29 | 0.88 |
| 3 | 1.2 | 38.35 | 39.65 | 1.30 | 1.08 | 0.75 |
| 4 | 1.2 | 39.05 | 39.65 | 0.60 | 0.5 | 0.53 |

Table 1 shows comparative examples relating to the stress condition of the circular-arc corner surface 41 in cases of changing the radius R1 of a starting point of the circular-arc labyrinth corner while keeping the radius R2 of a starting point of the circular-arc root surface 42 and the radius of curvature "r" of the circular-arc corner surface 41 constant.

According to these results of the analysis, it was found that the examples 2-4, having values of the ratio (R2−R1)/r of 1.29, 1.08, 0.5, show that the ratio of generated stress is reduced respectively to 0.88, 0.75, 0.53 in accordance with reduction of the value of the ratio (R2−R1)/r when determining the generated stress as 1 (reference) of the case where the value of the ratio (R2−R1)/r is 1.71 (in case of example 1). This means that it is better in point of the ratio of generated stress when the ratio of the radius of curvature is 1.25 or less.

FIG. 8 is a longitudinal section view of a fifth embodiment of a vehicle wheel bearing apparatus. FIG. 9 is an enlarged view of an encircled portion B in FIG. 8. The fifth embodiment is a modification of the fourth embodiment modified so that the pitch circle diameter PCDo of the outer side ball group 4 is set larger than a pitch circle diameter PCDi of the inner side ball group 4 (PCDo>PCDi). The number of rollers Zo of outer side ball group 4 is set larger than the number of rollers Zi of inner side ball group 4 (Zo>Zi). The same reference numerals are used to designate the same parts as those having the same functions used in the previous embodiments.

The wheel bearing apparatus of this embodiment includes an inner member 43, an outer member 44, and double rows of ball groups 4, 4 freely rollably contained between the inner and outer members 43, 44. The inner member 43 includes the wheel hub 45 and an inner ring 6 press fit onto the wheel hub 45 with a predetermined interference.

The wheel hub 45 is integrally formed with a wheel mounting flange 7 at its outer side end. One (outer side) inner raceway surface 45a is formed on the outer circumference. A cylindrical portion 5b extends from the inner raceway surface 45a through an axially extending shaft-shaped portion 29b.

The outer member 44 is integrally formed on its outer circumference with a body mounting flange 34c. Its inner circumference includes an outer side outer raceway surface 44a opposite to the inner raceway surface 45a of the wheel hub 45 and an inner side outer raceway surface 2b opposite to the inner raceway surface 6a of the inner ring 6. Double row rolling element groups 4, 4 are freely rollably contained, via cages 9c, 10, between these raceway surfaces. Seals 36, 12 are mounted within annular openings formed between the outer member 44 and inner member 43. The seals 36, 12 prevent leakage of grease contained in the bearing and the entering of rain water and dusts into the bearing from the outside.

In this embodiment, a pitch circle diameter PCDo of the outer side rolling element group 4 is set larger than a pitch circle diameter PCDi of the inner side rolling element group 4 (PCDo>PCDi). Due to the differences in the pitch circle diameter PCDo, PCDi, the number of rollers Zo of outer side rolling element group 4 is set larger than the number of rollers Zi of inner side rolling element group 4 (Zo>Zi). Thus, it is possible to increase the bearing rigidity and the loading capacity of the outer side of the bearing apparatus. Accordingly, it is possible to have an optimum design balanced in whole with the sealability, weight, strength and rigidity.

As shown in the enlarged view of FIG. 9, the outer side seal 36 includes a contacting seal 37 mounted on the outer member 44. The seal tip contacts with the base portion 7c of the wheel hub 45. A labyrinth seal gap 38 is formed between the outer member 44 and the wheel hub 45.

The outer circumference portion, from the outer side edge of the inner raceway surface 45a of the wheel hub 45 to the inner side side face 7d of the wheel mounting flange 7, includes the circular-arc base portion 7c with a gradually increasing diameter toward the outer side, corner surface 41 continuous to the base portion 7c with a circular-arc cross-section, and a circular-arc root surface 42 continuous from the corner surface 41 to the flat side face 7d of the wheel mounting flange 7.

In addition, the outer circumferential surface of the wheel hub 45 from the outer side end portion of the shaft-shaped portion 29b to the inner side side face 7d of the wheel mounting flange 7 includes the base portion 7c with its radius increasing toward the outer side. The circular-arc corner surface 41 is continuous to the base portion 7c. The circular-arc root surface 42 is continuous to the inner side side face 7d of the wheel mounting flange 7. Thus, the stress concentration at the root portion of the wheel mounting flange can be reduced when moment loads are applied to the wheel bearing apparatus and improve the strength and durability.

Similarly to the previous embodiment, the difference in radius (R2−R1) is set, also in this embodiment, so that a ratio relative to a radius of curvature "r" of the corner surface 41, i.e. (R2−R1)/r, is within a range 0.75~1.25 as described above, the sealing performance at the outer side end portion can be assured and a stress generated on the root of the wheel mounting flange 7 can be reduced.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

The vehicle wheel bearing apparatus of the present disclosure can be applied to any of the bearing apparatus of a first~fourth generations irrespective of the driving wheel or the driven wheel.

What is claimed is:

1. A wheel bearing apparatus for a vehicle comprising:
an outer member formed, on its inner circumference, with double row outer raceway surfaces;
an inner member including a wheel hub and at least one inner ring fit onto a cylindrical portion of the wheel hub or an outer raceway surface of a constant velocity universal joint, the wheel hub includes a wheel mounting flange formed integrally at one end, a cylindrical portion axially extends from the wheel mounting flange, the inner member is formed, on its outer circumference, with double row inner raceway surfaces arranged opposite to said double row outer raceway surfaces;
double row rolling element groups are freely rollably contained between said inner and outer raceway surfaces of the inner member and the outer member; and
a pitch circle diameter of the rolling element group near to the wheel mounting flange is larger than a pitch circle diameter of the double row rolling element group away from the wheel mounting flange, a maximum diameter of the outer raceway surface of the smaller diameter side of the double row outer raceway surfaces of the outer member is substantially the same as an inner diameter of a shoulder portion of the outer diameter side, a size of each rolling element of the group near to the wheel mounting flange is different from that of each rolling element of the group away from the wheel mounting flange, and a number of rolling elements of the group near to the wheel mounting flange is larger than a number of rolling elements of the group away from the wheel mounting flange.

2. The wheel bearing apparatus for a vehicle of claim 1, wherein the size of each rolling element of the group near to the wheel mounting flange is larger than that of each rolling element of the group away from the wheel mounting flange.

3. The wheel bearing apparatus for a vehicle of claim 1, wherein the size of each rolling element of the group near to the wheel mounting flange is smaller than that of each rolling element of the group away from the wheel mounting flange.

4. The wheel bearing apparatus for a vehicle of claim 1, wherein the rolling elements are balls.

5. The wheel bearing apparatus for a vehicle of claim 1, wherein the rolling elements are tapered rollers, a diameter of each tapered roller of the group near to the wheel mounting flange is larger than a diameter of each tapered roller of the group away from the wheel mounting flange, and wherein a length of each tapered roller of the group near to the wheel mounting flange is larger than a length of each tapered roller of the group away from the wheel mounting flange.

6. The wheel bearing apparatus for a vehicle of claim 5, wherein a larger flange to guide the tapered rollers is not formed on the larger diameter side of the inner raceway surface of the wheel hub, but is formed on the larger diameter side of the outer raceway surface of the outer member.

7. The wheel bearing apparatus for a vehicle of claim 1, wherein the outer member is integrally formed on its outer circumference with a body mounting flange to be mounted on a knuckle forming a portion of a suspension apparatus, and wherein a smooth annular groove having a circular-arc cross-section and a predetermined depth is formed on its outer side root portion.

8. A wheel bearing apparatus for a vehicle of claim 7, wherein the body mounting flange is formed as a plurality of projections around the outer circumference of the outer member, and wherein a smooth circumferential groove having a circular-arc cross-section is formed on the outer circumference between the projected body mounting flanges so that the circumferential groove communicates with the annular groove.

9. A wheel bearing apparatus for a vehicle of claims 1, wherein seals are mounted in annular space openings formed between the outer member and the inner member, an outer side seal of these seals includes a contacting seal mounted on the outer member and include a tip end in sliding contact with the wheel hub, a labyrinth seal gap formed between the outer member and the wheel hub, the outer circumference region of the wheel hub from an outer side end portion of the shaft-shaped portion of the wheel hub to an inner side side face of the wheel mounting flange includes a base portion with a diameter increasing toward the outer side, a circular-arc corner surface continuous to the base portion, a circular-arc root surface continuous to an inner side side face of the wheel mounting flange, the outer side inner circumferential surface and the end face of the outer member are arranged proximate to the circular-arc corner surface, and a gap with an L-shaped cross-section forms a labyrinth gap between the corner surface and the outer member.

10. A wheel bearing apparatus for a vehicle of claim 1, wherein the inner member includes the wheel hub and the inner ring, the wheel hub having on its outer circumference one inner raceway surface opposite to one outer raceway surface of the double row outer raceway surfaces, the cylindrical portion axially extending from the inner raceway surface via the shaft-shaped portion, the inner ring is press fit onto the cylindrical portion of the wheel hub and formed on its outer circumference with the other inner raceway surface opposite to the other outer raceway surface of the double row outer raceway surfaces, and a substantially conical recess is formed on the end portion at the wheel mounting flange side of the wheel hub, a depth of the recess extends to at least near the shaft-shaped portion of the wheel hub, and the outline configuration of the wheel hub is formed so that the wall thickness of the outer side end of the wheel hub is substantially constant corresponding to the configuration of the recess.

11. A wheel bearing apparatus for a vehicle of claim 1, wherein the inner ring is axially secured by applying a pre-determined bearing pre-pressure by a caulked portion formed by plastically deforming the end portion of the cylindrical portion of the wheel hub radially outward.

* * * * *

UNITED STATES PATENT AND TRADEMARK OFFICE
CERTIFICATE OF CORRECTION

PATENT NO.        : 7,832,942 B2
APPLICATION NO.   : 12/394117
DATED             : November 16, 2010
INVENTOR(S)       : Kazuo Komori et al.

It is certified that error appears in the above-identified patent and that said Letters Patent is hereby corrected as shown below:

Column 9
Line 60 "58~4 HRC" should be --58~64 HRC--

Signed and Sealed this
Twenty-second Day of February, 2011

David J. Kappos
*Director of the United States Patent and Trademark Office*